United States Patent [19]

Wanek et al.

[11] Patent Number: 5,017,110

[45] Date of Patent: May 21, 1991

[54] APPARATUS FOR PRODUCING HIGH-TEMPERATURE RESISTANT POLYMERS IN POWDER FORM

[75] Inventors: Erich Wanek, Vöcklabruck; Josef Baumgartinger, Ungenach; Manfred Schobesberger, Seewalchen; Rupert Stadlbauer, Lenzing; Klaus Weinrotter, Vöcklabruck, all of Austria

[73] Assignee: Lenzing Aktiengesellschaft, Austria

[21] Appl. No.: 436,193

[22] Filed: Nov. 13, 1989

Related U.S. Application Data

[62] Division of Ser. No. 155,372, Feb. 12, 1988, Pat. No. 4,897,227.

[30] Foreign Application Priority Data

Feb. 16, 1987 [AU] Australia .............................. 322/87

[51] Int. Cl.$^5$ ................................................ B29B 9/04
[52] U.S. Cl. .......................................... 425/7; 425/68; 425/302.1
[58] Field of Search .................... 425/7, 10, 67, 68, 70, 425/302.1, DIG. 49; 264/6, 8, 9, 11, 13, 14, 115, 116, 118, 140; 428/296, 408

[56] References Cited

U.S. PATENT DOCUMENTS

| 2,510,135 | 6/1950 | Pedlow et al. ............... 425/68 X |
|---|---|---|
| 2,755,509 | 7/1956 | Smidth ............................. 264/118 |
| 3,341,645 | 9/1967 | Horiuchi et al. ............. 425/67 X |
| 3,617,590 | 11/1971 | Neukomm et al. ............. 264/118 |
| 3,930,097 | 12/1975 | Alberino et al. ............... 428/408 |
| 3,981,957 | 9/1976 | van Brederode et al. ......... 264/8 |
| 4,016,227 | 4/1977 | Lines et al. ..................... 264/14 |
| 4,091,058 | 5/1978 | Sander et al. ................... 264/11 |
| 4,206,161 | 6/1980 | Sato et al. ...................... 264/11 |
| 4,416,600 | 11/1983 | Lecznar et al. ................... 425/7 |
| 4,498,957 | 2/1985 | Sasaki et al. ..................... 264/6 |
| 4,642,262 | 2/1987 | Piotrowski et al. ............. 428/296 |
| 4,810,445 | 3/1989 | Lamb, Sr. et al. .......... 264/115 X |

FOREIGN PATENT DOCUMENTS

| 0131085 | 2/1984 | European Pat. Off. . |
|---|---|---|
| 2543384 | 4/1977 | Fed. Rep. of Germany . |
| 2143080 | 5/1977 | Fed. Rep. of Germany . |
| 2746782 | 12/1980 | Fed. Rep. of Germany . |

Primary Examiner—Richard L. Chiesa
Attorney, Agent, or Firm—Ostrolenk, Faber, Gerb & Soffen

[57] ABSTRACT

For the continuous automated production of powders that are well suited for hot pressing, i.e. those consisting essentially of spherical or cubic particles, of high-temperature resistant polymers without damage to the polymer structure in the course of the production process, a concentrated solution of the polymer in an aprotic polar solvent is continuously expressed into a twisting cone of hot aqueous precipitant. In doing so, short irregular wormy formations form, which are united to a fleecelike web, washed with aqueous solvents and finally with water, dried and comminuted. The plant provided for carrying out the process requires comparatively little space, since it does not include treatment tanks for extraction and drying.

6 Claims, 3 Drawing Sheets

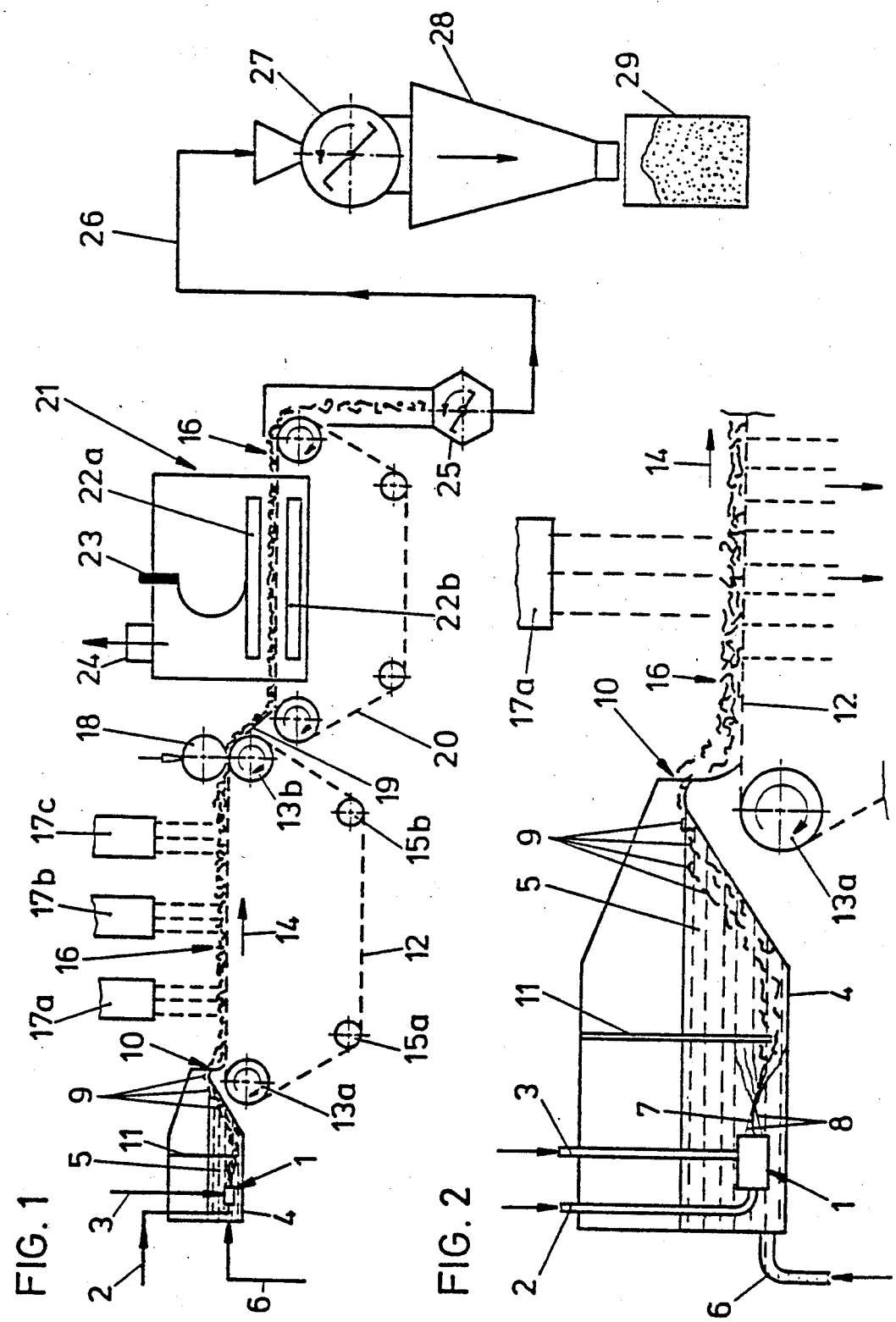

APPARATUS FOR PRODUCING HIGH-TEMPERATURE RESISTANT POLYMERS IN POWDER FORM

This is a division of application Ser. No. 07/155,372, filed Feb. 12, 1988 now U.S. Pat. No. 4,897,227.

BACKGROUND OF THE INVENTION

1. Field of the Invention

The invention relates to a process for producing high-temperature resistant polymers in powder form as well as to a plant for carrying out the process.

2. Description of the Related Art

Such powders are required at the production of shaped bodies from high-temperature resistant polymers by hot pressing, which polymers,. in particular, comprise polyimides (cf., for instance, H. G. Elias and F. Vohwinkel, "Neue polymere Werkstoffe für die industrielle Anwendung: Struktur, Synthese, Eigenschaften, Verarbeitung; 2nd Series, pp. 257 to 288, Carl Hanser Verlag Munich Vienna, 1983).

According to a process proposed in the U.S.A. and known to Applicants, the polymer solution is pressed through a spinneret and the continuous filaments formed are cut into pieces by means of a rotating scraper. Upon washing and drying, the pieces are ground to a powder. This involves the difficulty that the solvent can be removed from the cut filament pieces only by a long-lasting extraction procedure, which renders the continuous production of a powder unfeasible. In addition, long extraction and drying times impair the quality of the polymers.

In DE-C 21 43 080, mixed polyimides are described, which may be obtained in powder form by precipitation from their solutions in polar organic solvents. The products discontinuously incurring in this manner all exhibit a poor thermal conductivity and a high affinity to aprotic polar solvents as well as to water. Therefore, it is necessary to extract the precipitated polymers discontinuously over several hours and to finally dry the same under vacuum at a very high temperature of about 200° C. for several hours. However, the mixed polyimides described are characterized by a sensibility to hydrolysis, in particular at elevated temperatures, for which reason defects must be put up with in view of the desired product qualities.

It is, furthermore, known to obtain fibrids, i.e., branched fibrous particles of various synthetic polymers, by applying shear forces while cooling or precipitating or by evaporating the liquid phase. Such polymer particles morphologically resemble cellulose fibers in terms of size and shape.

In EP-A - 0 131 085, for instance, the production of fibrids from thermoplastic synthetic materials by relaxation evaporation of a polymer solution under shear inducing conditions is described, with the actual or apparent solution of the polymer being relaxed in a binary spinneret by applying overheated steam.

Due to their structure, fibrids are not at all suited for the production of polymer powders with approximately spherical or cubic shapes of their individual particles. When grinding fibrids, particles again will be obtained that have fibrous structures and are not suited for pressing. Add to this that fibrids are to be comminuted with a poor grinding efficiency.

Besides, the production of fibrids from high-temperature resistant polymers has not become known yet.

SUMMARY OF THE INVENTION

The invention aims at eliminating the difficulties pointed out and has as its object to continuously produce readily pressable powders from high-temperature resistant synthetics without damage to the polymer structure.

In accordance with the invention, the set object is achieved in that a concentrated solution of a polymer, in particular of a polyimide, in an aprotic polar solvent, such as dimethyl formamide, dimethyl acetamide, dimethyl sulfoxide or N-methyl pyrrolidone, is continuously expressed into the region of a twisting cone of hot aqueous precipitant, with short irregular wormy formations forming, which are united to a fleece-like web, washed with aqueous solvents and finally with water, dried and comminuted.

Without providing the twisting cone of precipitant, smooth continuous filaments or strands would be obtained when expressing the polymer solution into a precipitating bath. According to the invention, the emerging filament of strand is seized by the twisting cone and is set in rotation about its longitudinal axis, thus being twisted off directly at the outlet. Due to the turbulent flow conditions prevailing, an excellent extraction of organic impurities, such as oligomers and starting products, from the solidifying strand or filament is caused already at this stage.

The dimensions of the wormy formations may be varied between about 1 to 8 cm in length and about 0.5 to 5 mm in diameter.

On account of their irregular curved and ribbed shapes, the twisted off formations may be united to a fleece-like web, thereby enabling an easily controlled continuous after-treatment of the same, i.e., washing (extraction), drying and comminuting.

Preferably, the concentrated solution of the polymer is expressed through the central bore of a binary spinneret into a bath of aqueous precipitant, and hot aqueous precipitant is fed to the peripheral channel of the binary spinneret under pressure, the precipitant, thus, getting a twist when streaming through the peripheral channel, whereupon the precipitant leaves into the bath in a manner converging towards the axis of the central bore.

Thus, a twisting cone of hot aqueous precipitant is formed in a simple and operationally safe manner. The aperture angle of the twisting cone, the pressure, the temperature and the rotation speed of the precipitant take an influence on the length and shape of the wormy formations produced.

When using a binary spinneret, the aqueous precipitant, suitably, is fed to the peripheral channel at a temperature of 20° to 95° C. and under a pressure of 10 to 100 bar.

Preferably, the solution of a mixed polyimide comprising structural units of the general formula

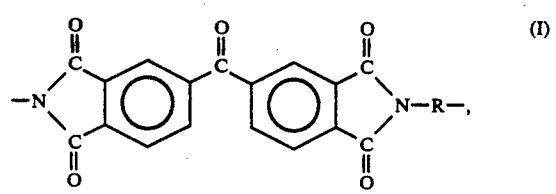

wherein R represents 2,4- and/or 2,6-toluylene or is a group of the formula

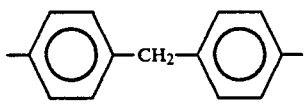

is used as the high-temperature resistant polymer.

A powder produced from such a polymer in accordance with the invention has a substantially higher inherent viscosity and, thus, higher average molecular weight than a powder of this material as produced so far.

As the concentrated polymer solution, preferably, a solution in dimethyl formamide having a polymer content of from 20 to 30% by mass is used. Such a solution has the appropriate viscosity and exhibits particularly favorable solidification properties.

Suitably, water or a mixture of water and dimethyl formamide is used as the precipitant.

It has proved favorable, especially for polyimides, if a dimethyl formamide-water mixture having a content of 30 to 80%, in particular 60%, of dimethyl formamide (DMF) is employed as the precipitant.

Upon combination of the primarily forming wormy polymer formations to a fleece-like web, this web, preferably, is guided through washing zones on a perforated belt of elastic material, whereupon the web is squeezed off between rolls and passes a suction path prior to drying proper.

In the first washing zone, it is particularly suitable to use a DMF-water mixture of approximately the same composition as the precipitant, as the washing or extracting agent, whereupon the concentrations of the aprotic solvent are reduced to an increasing extent in the subsequent washing zones and pure water is used as the washing agent in the final washing zone.

It is only the formation of the fleece-like web that enables the continuous after-treatment of the polymer formations. Subsequent drying also may be incorporated in the continuous process.

Preferably, drying is carried out in a high frequency (HF) drier, whereby this treatment stage is particularly gentle. The residual water adhering passes over into steam, yet no heating of the polymer formations themselves takes place such that neither thermic nor hydrolytic 15 damage to the polymers can occur. Add to this that the HF drier may be fed with the fleece-like web in a particularly uniform manner.

The residual moisture to be achieved in the HF drier amounts to less than 1% by mass, and the subsequent comminution advantageously is carried out in two steps by means of a cutter mill and an impact mill in order to attain a uniform grinding degree at an energy utilization as high as possible.

A plant suited to carry out the process according to the invention is characterized in that
  a binary spinneret comprising feeding ducts for a concentrated solution of a polymer and for an aqueous precipitant is provided, which binary spinneret enters into a precipitation trough provided with at least one feeding duct for precipitant,
  the charging end of a movable perforated belt is arranged below the discharge opening of the precipitation trough with washing means being located above the perforated belt substantially over its entire length,
  the delivery end of the perforated belt is arranged in front of the intake into a drier, and
  a one- or multi-stage comminution means is provided, following upon the run out of the drier.

Since, i.a., no large treatment tanks are required with this plant, its space demand is comparatively low.

By the precipitant supplied, a flow can be produced in the precipitation trough, on account of which the primarily forming wormy formations are conveyed to the discharge opening of the precipitation trough and washed away from there.

According to a preferred embodiment, a flow breaker is arranged in front of the mouth of the binary spinneret, which breaker does not reach as far as to the bottom of the precipitation trough.

The flow breaker, particularly suitably may be disposed at a variable distance in front of the mouth of the binary spinneret. The wormy formations may penetrate to the discharge opening through the gap left between the lower limitation of the flow breaker and the bottom of the precipitation trough. The distance between the binary spinneret and the flow breaker constitutes an additional parameter to influence the size and shape of the wormy formations forming.

Preferably, the binary spinneret is comprised of a sleeve provided with an internal thread and of a spinneret body to be screwed into the sleeve by leaving an annular gap, the spinneret body having a central bore and a frustoconical internal section, a lateral inlet entering into the annular gap is provided on the sleeve and a ring having slots that are directed obliquely towards the axis of the spinneret body is provided on the spinneret body, the mouth-side end of the spinneret body having a bevel converging towards the continuation of the axis and corresponding to a respective bevel of the sleeve.

The precipitant, which is under elevated pressure, gets through the lateral inlet into the annular gap. When passing through the inclinedly disposed slots of the ring provided on the spinneret body, the precipitant flow is given a rotation component so that a twisting cone forms in the precipitation bath when emerging from the annular gap.

Advantageously, trickling trays are provided as the washing means.

Below the perforated belt, basins suitably may be provided for collecting the washing and extracting agents, which are connected to the preceeding basin by overflow means. Thus, a concentration gradient of the organic solvent contained in the washings adjusts in the basins. To each basin, a trickling tray is allocated, pure water being supplied to the final trickling tray(s) of the series. In practice, it has proved particularly advantageous in many cases to feed the aqueous solvent (at the same time, precipitant) having the highest content of aprotic polar solvent and collecting in the first basin of the series of basins—i.e., that nearest to the feed end of the perforated belt—both to the first trickling tray of the series and to the precipitation trough, and to even use it for the formation of the twisting cone, thus, according to the embodiment described, preferably to supply it to the annular gap of a binary spinneret under elevated pressure. A further partial stream of precipitant with the highest content of organic solvent from the first basin may be continuously withdrawn and fed to a separating station—for instance, a distilling or rectifying station—to be processed in order to recover the organic solvent.

According to a preferred embodiment, a high-frequency open-ended drier is provided. Such a drier ensures the uniform drying of the polymer formations contained in the fleece-like web, due to the deep action of HF energy, in contrast to the removal of moisture, for instance, in a tumbling drier, in which the energy must be supplied via hot contact surfaces. On account of the poor thermal transmission of the polymers and the vaccum applied, local overheatings so far occurred, as a rule, thus discoloring the polymer particles. This conventional drying procedure involves long periods of time (e.g., 48 hours), therefore, it could happen that the product had not been freed from water and residual solvent to the major extent due to dead spaces present in the drier.

With a further modification of the plant according to the invention, a cutter mill and an impact mill are consecutively arranged so as to follow the run out of the drier.

BRIEF DESCRIPTION OF THE DRAWINGS

The invention will now be explained in more detail by way of examples and with reference to the accompanying drawings, wherein:

FIG. 1 schematically illustrates a preferred embodiment of a plant according to the invention;

FIG. 2 is a schematic section of the plant according to FIG. 1, i.e., of the precipitation trough and of the feed end of the perforated belt;

DETAILED DESCRIPTION OF THE INVENTION

Figure 3:
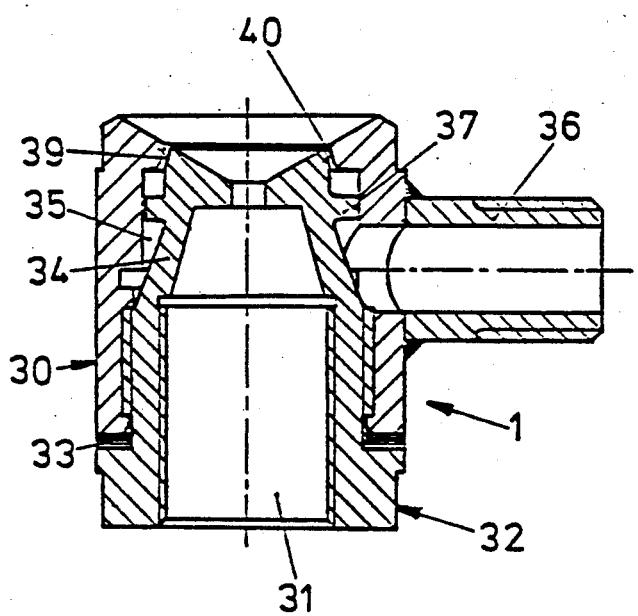
FIGS. 3 to 5 represent a binary spinneret to be used according to the invention, FIG. 3 being a section through the assembled spinneret, FIG. 4 being a lateral view of the spinneret body, and FIG. 5 being a top view onto the spinneret body.

In FIGS. 1 and 2, a binary spinneret is generally denoted by 1. To the binary spinneret 1, there are connected a central duct 2 for the concentrated solution of a polymer as well as a lateral duct 3 for hot aqueous precipitant. The binary spinneret 1 is arranged in a precipitation trough 4 below the level of a precipitation bath 5. A feeding duct for feeding precipitant into the precipitation trough 4 is denoted by 6. The concentrated polymer solution is fed via a pump (not illustrated) at a high pressure through the duct 2. The hot aqueous precipitant is supplied through duct 3—also at a high pressure. At the mouth of the binary spinneret 1, solidification and precipitation of the emerging filament or strand 7 of the concentrated polymer solution takes place, and by the effect of the twisting cone 8 indicated merely by its approximate contours, wormy formations 9 of polymer are forming from the solidifying filament or strand 7, which are carried away and washed out by the flow of precipitant forming between the mouth of at least one feeding duct 6 and the discharge opening 10 of the precipitation trough 4 (FIG. 2).

In front of the mouth of the binary spinneret 1, a flow breaker 11, which does not reach as far as to the bottom of the precipitation trough 4, is displaceably mounted such that the distance between the binary spinneret 1 and the flow breaker 11 may be changed.

The formations 9 immediately reach the feed end disposed below the discharge opening 10, of a movable perforated belt 12. The continuous perforated belt 12 is mounted on supporting rolls 13a, 13b, both on its feed end and on its delivery end. Depending on the length of the perforated belt 12 moving in the direction of the arrow 14, additional supporting rollers may be arranged between the two rolls illustrated. Other rolls may be provided to tense, drive and guide the perforated belt 12, two of them being denoted by 15a and 15b.

On the perforated belt 12, the polymer formations 9 unite to a relatively uniform fleece-like web 16, which is readily washable and extractable on account of the network of formations 9 held together by coarse entanglements.

Even the formations 9 that lie lowermost in the web 16 are perfectly extracted. The fleece-like web 16, nevertheless, has a completely sufficient coherence in order to ensure the faultless transportation through the plant according to the invention such that the defined residence time determined can be kept in any event.

Above the web 16 transported on the perforated belt 12, trickling trays are arranged, of which only three are illustrated (17a, 17b, 17c). These trickling trays, in the embodiment shown, define the individual washing and extracting zones, with pure water being supplied to the last trickling tray 17c, or with a larger number of washing zones, to the last trickling trays, in order to remove practically completely the aprotic polar solvent from the wormy formations 9. As already pointed out earlier, it is suitable in many cases to extract in the first washing zone or zones with a liquid of approximately the same composition as that of the aqueous precipitant in the precipitation bath 5 and to adjust a concentration gradient from the first to the last washing zones in the sense of a counter flow extraction. Below the perforated belt 12, a collecting basin (not illustrated) having compartments, or a plurality of collecting basins, may be provided for the washing liquids.

On the delivery end of the perforated belt 12, a movably mounted pressing roll 18 of elastic material is provided, which coacts with the supporting roll 13b. As the fleece-like web 16 passes through the roll gap, excessive surface moisture is squeezed off and the web 16 is transferred onto the conveying belt 20 of a high frequency open-ended drier 21 by a guiding means 19. In the region of the intake of the HF open-ended drier 21, the surface moisture still present, of the formations 9 constituting the web 16 may be reduced a second time by sucking off along a determined suction path before the web 16 enters the space between high frequency electrodes 22a and 22b. A powder feed 23 to the high-frequency electrode 22a is led through the upper casing wall of the HF open-ended drier 21.

The molecules of the residual water are stimulated during the short residence time by the HF energy and the water passes over into the steam phase. The steam is removed from the HF open-ended drier through a suction nozzle 24. The web 16, or polymer formations 9, are not heated themselves such that neither thermic nor a hydrolytic damage to the polymers will occur.

From the run out of the HF open-ended drier 21, the fleece-like web 16 gets into a cutter mill 25, which serves as a pre-comminuting means. The pre-comminuted stock is supplied through a duct 26 to an impact mill 27, in which fine grinding takes place. The resulting powdery high-temperature resistant polymer falls into a reservoir 29 through a powder funnel 28.

Figure 4:
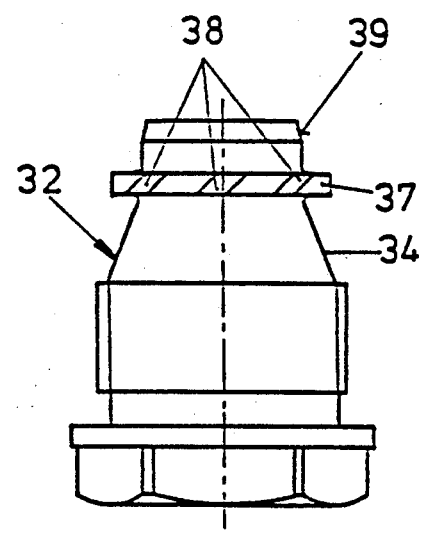
Figure 5:
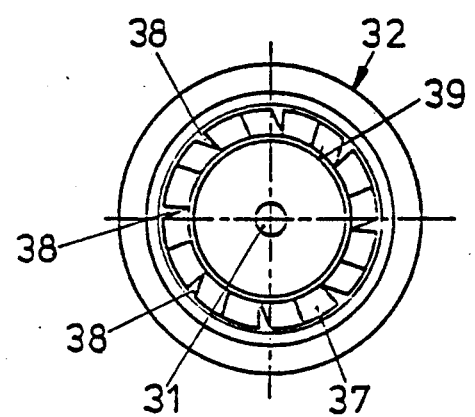

The special binary spinneret 1 illustrated in FIGS. 1 and 2 just schematically, according to FIGS. 3 to 5 is comprised of a sleeve 30 having an internal thread as well as of a spinneret body 32 having a central bore 31 and to be screwed into the sleeve 30, which spinneret body, with the embodiment illustrated, also is provided with an internal thread to be connected to the central duct 2. To completely seal the screw connection between the sleeve 30 and the spinneret body 32, a sealing ring 33 is provided.

Between the sleeve 30 and the spinneret body 32, which has a frustoconical internal section 34, an annular gap 35 is left upon complete screwing in of the spinneret body 32, in which gap a lateral inlet 36 provided on the sleeve 30 enters. The lateral inlet 36 is provided with an external thread to be connected to the duct 3. On the spinneret body 32, a ring 37 having a substantially circularly ring-shaped cross section is provided in the region of the annular gap 35, whose external diameter is only slightly smaller than the internal diameter of the sleeve 30. The ring 37 includes slots 38 that are directed obliquely towards the axis of the spinneret body 32 (FIGS. 4 and 5). The mouth-side end of the spinneret body 32 has a bevel 39 converging towards the continuation of the axis of the spinneret body 32 outside of the binary spinneret 1. The sleeve 30 is designed with a corresponding bevel 40 such that, in the assembled state of the binary spinneret 1, a narrow gap is left between the bevels 39 and 40, through which hot aqueous precipitant may leave.

Figure 6:
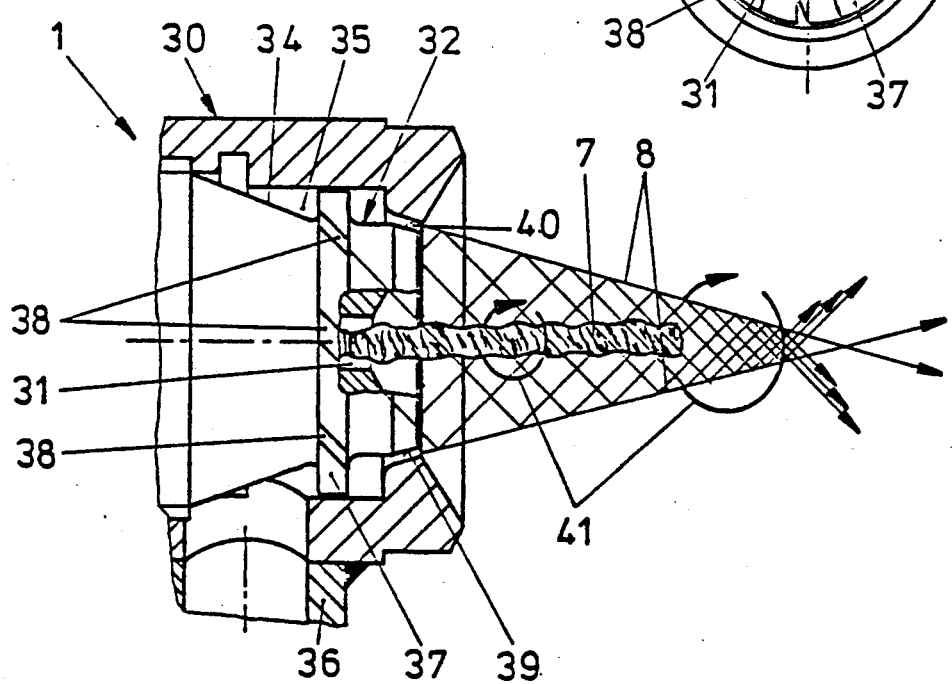
FIG. 6 illustrates the formation of a twisting cone at the mouth of a binary spinneret as shown in FIGS. 3 to 5.

The emerging precipitant forms the twisting cone 8 indicated by its approximate contours in FIG. 6, by which the precipitation bath 5 is set in rotation in front of the mouth of the binary spinneret 1. The flow pattern forming is roughly illustrated by straight arrows.

The concentrated polymer solution pressed out of the central bore 31 of the spinneret body 32 in the form of a solidifying filament or strand 7 is seized by the flow in the region of the twisting cone and likewisely is set in rotation (curved arrows 41), the filament or strand 7 thus being twisted off in short irregular wormy formations 9 at the mouth of the spinneret. The shape and length of the formations 9 are primarily determined by the extent of the pressure under which the hot aqueous precipitant is supplied through the lateral duct 3 of the binary spinneret 1 as well as by the distance of the flow breaker 11 from the mouth of the binary spinneret 1 (FIGS. 1 and 2). The higher the pressure, the more intensive the twisting and rotational movements and the shorter the formations 9. The approachment of the flow breaker 11 to the spinneret mouth acts in the same sense due to the twisting cone being shortened thereby. Thus, the process parameters suitable in each case may be chosen for polymer solutions of different viscosities, the ratio of the length to the diameter of the formations 9 being kept approximately constant.

Figure 7:
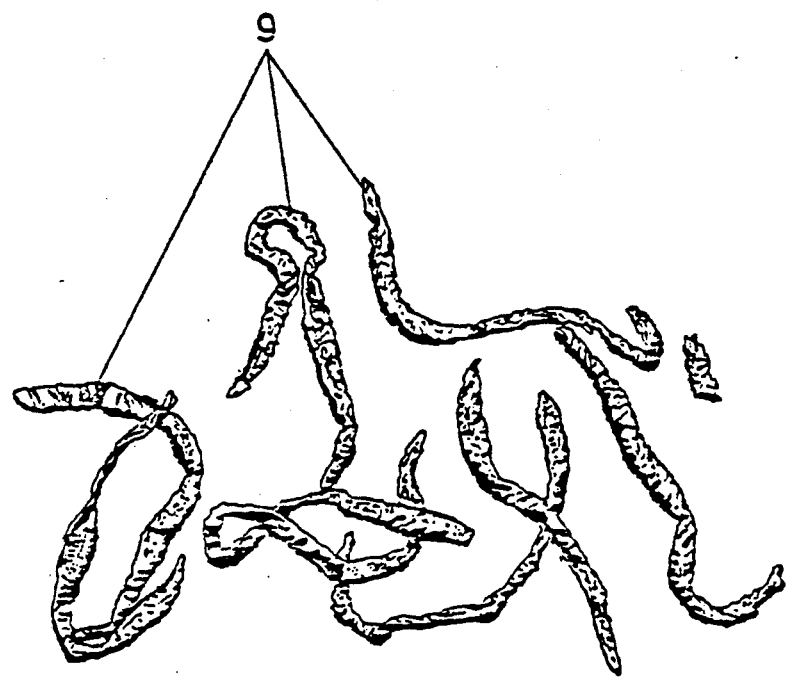
FIG. 7 illustrates short irregular wormy formations of high-temperature resistant polymer as first formed in accordance with the invention.

The extraction effect of the aqueous precipitant is better with a slighter diameter of the formations 9. The strength (cohering capacity) of the fleece-like web 16 depends on the length and the degree of curvature of the formations 9 (cf. FIG. 7).

Too high a concentration of the aprotic polar solvent in the precipitation bath 5 as well as in the twisting-cone generating hot aqueous precipitant is not favorable, because the expressed polymer solution would solidify too slowly. On the other hand, pure water has not proved particularly suited for this purpose, either, because the crust formation on the surface of the filament or strand 7 formed occurs too rapidly, thus impeding the complete extraction of the aprotic polar solvent from the interior of the formations 9.

In the following examples 1 to 4, a solution of a high-temperature resistant mixed polyimide having repeatedly occurring structural units of formula (I) is used, wherein R represents 2,4- and/or 2,6-toluylene for about 80% by mol and a group of the formula

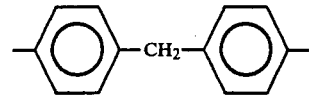

for about 20% by mol.

The production of the powders was effected in a plant according to FIGS. 1 to 5.

Example 1

A solution of 25% by mass of a mixed polyimide and having a viscosity of 138 falling-ball seconds (falling ball: ball diameter 2.1 mm, measuring temperature 70° C., pre-tempering time 3 hours, pipe diameter 30 mm, ball material bearing steel, measured length 100 mm) in dimethylformamide (DMF) was prepared, which was expressed into a precipitation bath 5 through the central bore 31 of a binary spinneret 1 at a temperature of 45° C. under a pressure of about 40 bar. The aqueous precipitant was fed to the binary spinneret 1 at a temperature of 80° C. under a pressure of 27 bar. The aqueous precipitant—like the precipitation bath 5—had a concentration of 48% DMF.

The fleece-like web 16 formed was guided through seven consecutive washing and extracting zones, with an aqueous washing liquid having 48% DMF being used in the first zone, one having 20.5% DMF being used in the second zone, one having 11.5% DMF being used in the third zone, one having 0.2% DMF being used in the fourth zone, and with pure water being used in the fifth to seventh zones. The temperature of the washing liquids and of the water each amounted to 80° C.

The web 16 was squeezed off by applying a pressure of 4 bar.

The power of the HF open-ended drier was 8.3 kW, the electrode voltage was 100 kV.

The wormy formations 9 had a length of 3 to 8 cm and a mean diameter of about 3 to 4 mm.

As the pre-cutting mill, a cutter mill having a perforated plate insert (diameter of the perforations: 3 mm) was used.

The pre-comminuted material was further comminuted by means of an impact mill.

Properties of the polymer powder obtained:
Fineness: <0.075 mm
DMF content: 0.07%
$H_2O$ content: 1.34%
Inherent viscosity ($eta_{inh.NMP}$) measured at a concentration of 0.5 g/dl in N-methyl pyrrolidone: 0.63 dl/g.

The inherent viscosity is proportionate to the chain length of the linear polymer dissolved and, thus, also proportionate to the molecular weight.

With conventionally produced mixed polyimide powders of this type, $eta_{inh.NMP}$ values of as low as about 0.40 to about 0.47 dl/g could be measured, from which damage to the polymer structure of known products may be concluded.

Example 2

It was proceeded as in Example 1, the following parameters having been changed: Solution: 30% by mass mixed polyimide, viscosity: 93 falling ball seconds, temperature: 25° C. Aqueous precipitant: pressure 19 bar, 25% DMF Washing zones:
zone 1: 25% DMF
zone 2: 24% DMF
zone 3: 0.2% DMF
zones 4 to 7: $H_2O$
Dimensions of formations 9: length: 3 to 5 cm diameter: 2 to 3 mm
HF open-ended drier: power: 5.2 kW electrode voltage: 70 kV
Properties of the polymer powder obtained:
Fineness: 0.15 to 0.425 mm
DMF-content: none
$H_2O$-content: 1.5%
eta$_{inh\ NMP}$: 0.60 dl/g

Example 3

The same concentrated polymer solution as in Example 2 was used, for the rest it was operated as in Example 1, yet with the difference that, both for the production and for the extraction of the formations 9, pure water having a temperature of 70° C. was used in the washing zones, which water was supplied to the binary spinneret 1 at a pressure of 30 bar.

The length of the wormy formations 9 obtained ranged between 3 and 8 cm, the diameter amounted to 3 to 5 mm. In the HF open-ended drier, a power of 5.2 kW was taken up with an electrode voltage of 55 kV.

Properties of the polymer powder obtained:
Fineness: <0.075 mm
DMF content: 0.02%
$H_2O$ content: 1.2%
eta$_{inh\ NMP}$: 0.55 dl/g

Example 4

The solution specified in Example 2 and having a temperature of 25° C. again was used as the concentrated polymer solution. As in contrast to the mode of operation described in Example 1, the following conditions were chosen:

Aqueous precipitant: pressure 34 bar, 56% DMF
Washing zones:
zone 1: 56% DMF
zone 2: 13% DMF
zone 3: 1.6% DMF
zone 4: 0.8% DMF
zones 5 to 7: $H_2O$
Dimensions of formations 9:
length: 3 to 7 cm
diameter: 2 to 4 mm
HF open-ended drier: power 9.8 kW
electrode voltage: 60 kV
Properties of the polymer powder obtained:
Fineness: 0.15 to 0.425 mm
DMF content: none
$H_2O$ content: 2.1%
eta$_{inh\ NMP}$: 0.70 dl/g

Example 5

A solution having a concentration of 35.9% by mass of a polyether imide having the following constitution:

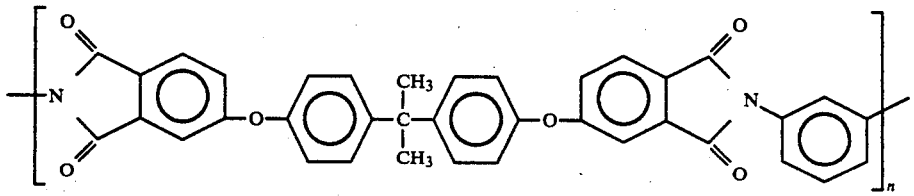

in DMF was prepared, which solution had a viscosity of 48.9 falling ball seconds. This solution was expressed into a precipitation bath 5 through the central bore 31 of a binary spinneret 1 at a temperature of 25° C. and under a pressure of about 40 bar. The aqueous precipitant (31% DMF in water) was supplied to the binary spinneret 1 at a temperature of 80° C. under a pressure of 18 bar.

Washing (extraction) zones:
Zone 1: 31% DMF in $H_2O$
Zone 2: 16% DMF in $H_2O$
Zone 3: 7% DMF in $H_2O$
Zone 4: 2% DMF in $H_2O$
Zones 5 to 7: $H_2O$ The temperatures of the washing liquid an of the water each amounted to 80° C.

Squeezing pressure of rolls 13a, 18 at delivery end of perforated belt 12: 4 bar
Dimensions of wormy formations 9: length: 20 to 25 mm
mean diameter: 3 to 5 mm
HF drying: power: 9 kW
electrode voltage: 8 kV
Grinding two-stage grinding in pre-cutting mill and in impact mill
Properties of the polymer powder obtained:
Fineness: 0.15 to 0.425 mm
DMF content: 0.4%
Water content: 2.1%
eta$_{inh\ NMP}$: 53.52 dl/g (measured analogously to Example 1).

As in contrast to known products, the high-temperature resistant polymers in powder form produced according to the invention have a uniform appearance free of discoloration and are practically free of solvent.

The powder density of the powders obtained according to the invention, of approximately spherical particles ranges between 0.5 and 0.6 g/cm$^3$, whereas polyimide powder produced of fibrides and having a fibrous structure has a powder density of 0.3 to 0.35 g/cm$^3$ only.

Production and properties of compressed bodies of polymer powders to be obtained according to the invention:

(A) Tensile strength, breaking elongation

Production of specimen

Into a tension specimen tool preheated to 250° C., 6 g of pre-dried polyimide powder of the composition defined in connection with Examples 1 to 4 were filled, spread, the tool was closed and a slight pressure was applied. The temperature is raised to almost 350° C., the pressure is released briefly for the purpose of ventilation, whereupon a pressure of 350,000N/mm$^2$ is applied. This pressure is maintained for 10 min at a temperature of 350° C. Subsequently, cooling to about 250° C. under pressure and removal are effected. Test standard: ASTM D638-72

| Specimen | Density (g/cm$^3$) | Tensile strength (N/mm$^2$) | Elongation % |
|---|---|---|---|
| 1 | 1.34 | 128 | 4.7 |
| 2 | 1.34 | 124 | 4.6 |
| 3 | 1.34 | 120 | 4.5 |

(B) Compressive strength, breaking compression

Production of specimen: Specimen are machined from the solid material. Test standard: ASTM D695-69

| Specimen | Compressive Strength (N/mm$^2$) | Breaking Compression (%) |
|---|---|---|
| 1 | 446 | 31.4 |
| 2 | 389 | 29.0 |
| 3 | 410 | 30.6 |

Elastic modulus (averaged): 4140N/mm$^2$ (C) Dimensional stability under heat

Production of specimen: The test specimen (120×15× 3.5 mm) were produced in the required shape by pressure sintering analogous to A). Test standard: ISO/R 75, test method A (1.85 n/mm$^2$

| Specimen | Dimensional stability under heat (°C.) |
|---|---|
| 1 | 288 |
| 2 | 281 |

What we claim is:

1. A plant for producing high-temperature resistant polymers in powder form by preparing a concentrated solution of a polymer in an aprotic polar solvent, comprising means for expressing said concentrated polymer solution continuously into the region of a twisting cone of hot aqueous precipitant by forming short irregular wormy formations, means for uniting said formations to a fleece-like web, means for washing said formations with aqueous solvents and finally with water, and means for drying and comminuting said formations, said plant further comprising:

a binary spinneret receiving feeding duct means for said concentrated polymer solution and for said aqueous precipitant, a precipitation trough provided with at least one precipitant feeding duct and having a discharge opening, said binary spinneret positioned within said precipitation trough and producing said twisted cone of said hot aqueous precipitant, a movable perforated belt having its feed end below said discharge opening of said precipitation trough, washing means provided above said perforated belt substantially over its entire length, a drying means having an intake immediately downstream from the delivery end of said perforated belt and an outlet, a one- or multi-stage comminuting means immediately downstream from said outlet of said drying means.

2. A plant as set forth in claim 1, further comprising a flow breaker provided in front of the mouth of said binary spinneret and reaching not as far as to the bottom of said precipitation trough.

3. A plant as set forth in claim 1, wherein said binary spinneret is comprised of a sleeve having an internal thread and of a spinneret body to be screwed into said sleeve by leaving an annular gap, said spinneret body has a central bore and a frustoconical inner section, a lateral inlet is provided on said sleeve so as to enter into said annular gap and a ring including slots directed obliquely to the axis of said spinneret body is provided on said spinneret body, the mouth-side end of said spinneret body has a first bevel converging towards the continuation of its axis, and said sleeve has a second bevel corresponding to said first bevel.

4. A plant as set forth in claim 1, wherein said washing means are comprised of trickling trays.

5. A plant as set forth in claim 1, wherein said drying means is comprised of a high-frequency open-ended drier.

6. A plant as set forth in claim 1, further comprising a cutter mill and an impact mill consecutively arranged downstream of the outlet of said drying means.

* * * * *

UNITED STATES PATENT AND TRADEMARK OFFICE
CERTIFICATE OF CORRECTION

PATENT NO. : 5,017,110
DATED : May 21, 1991
INVENTOR(S) : Erich Wanek, Josef Baumgartinger, Klaus Weinrotter, Manfred Schobesberger, Rupert Stadlbauer It is certified that error appears in the above-identified patent and that said Letters Patent is hereby corrected as shown below:

Title Page, change the foreign appliction priority data from "Australia" to --Austria--.

Signed and Sealed this

Sixteenth Day of February, 1993

Attest:

STEPHEN G. KUNIN

*Attesting Officer*     Acting Commissioner of Patents and Trademarks